UNITED STATES PATENT OFFICE.

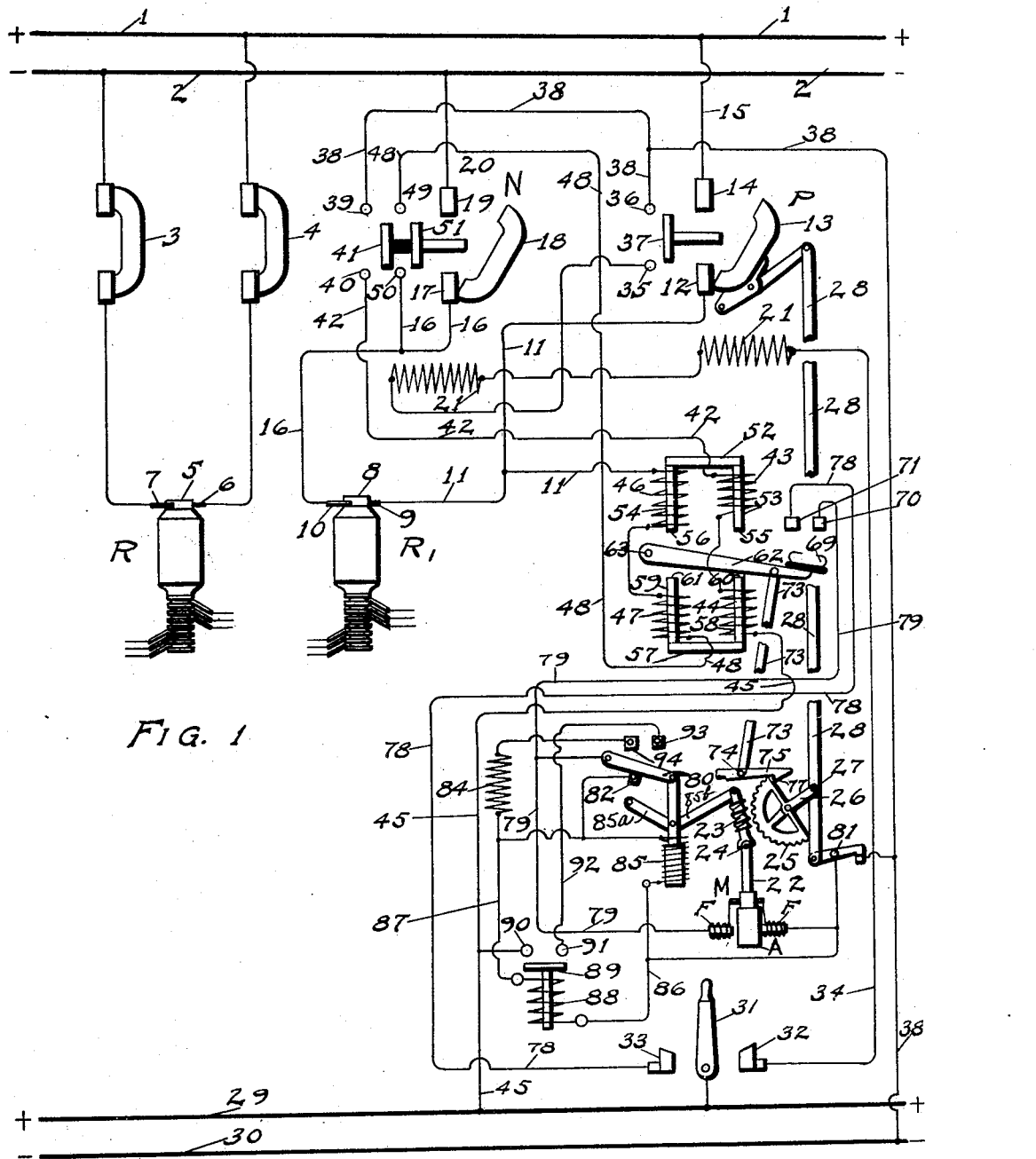

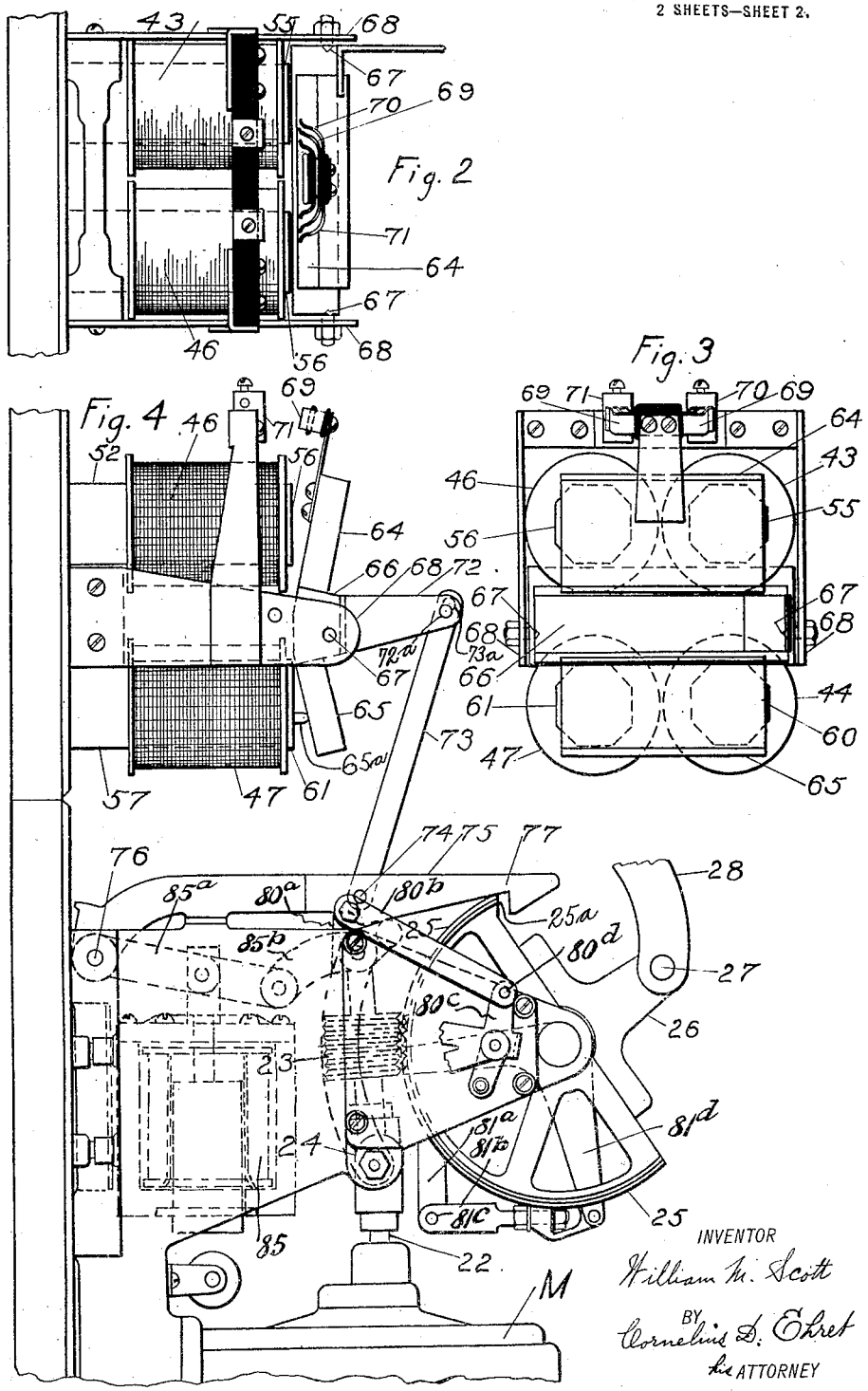

WILLIAM M. SCOTT, OF TREDYFFRIN TOWNSHIP, CHESTER COUNTY, PENNSYLVANIA.

SWITCHING APPARATUS.

1,407,953.  Specification of Letters Patent.  Patented Feb. 28, 1922.

Application filed May 6, 1918. Serial No. 232,695.

*To all whom it may concern:*

Be it known that I, WILLIAM M. SCOTT, a citizen of the United States, residing in Tredyffrin Township, in the county of Chester and State of Pennsylvania, have invented a new and useful Switching Apparatus, of which the following is a specification.

It is the object of my invention to provide electric switching apparatus for connecting to a circuit a source of current, such as a dynamo-electric generator, and more particularly a rotary converter, and which shall be inoperative or prevented from effecting such a connection unless a given terminal of the source of current is of proper polarity or bears proper polarity relation to that circuit or some other circuit or source of current.

To this end I provide switching mechanism for connecting the source of current to a circuit or other source of current, and means controlling the operation of the switching mechanism, allowing operation of the switching mechanism only upon existence of predetermined relation between the polarity of the source of current and the polarity of the circuit or other source of current to which it is to be connected.

My invention resides in apparatus of the character hereinafter described and claimed.

For an illustration of one of the various forms my invention may take, reference is to be had to the accompanying drawings, in which:

Fig. 1 is a diagrammatic view illustrating switching mechanism and circuit arrangements embodying my invention.

Fig. 2 is a top plan view of one form the polarity distinguishing device may take.

Fig. 3 is a front elevational view of the same.

Fig. 4 is a side elevational view of the same and of switch operating means controlled thereby.

Referring to Fig. 1, 1 and 2 are, respectively, the positive and negative conductors of a circuit energized through the switches 3 and 4 by any suitable source of current, this source, in the example illustrated, being a rotary converter R of which only the armature is illustrated, said armature having the direct current commutator 5 and the positive and negative brushes 6 and 7.

A second source of current to be connected with the conductors 1 and 2 is in the example illustrated a second rotary converter $R^1$ whose armature only is illustrated, said armature having the direct current commutator 8 and the brushes 9 and 10, which may be, respectively, positive and negative or negative and positive, depending with which half cycle of alternating current the armature falls in step, it being well known that a given terminal of the direct current side of an armature of a rotary converter may be either positive or negative. But it being essential that the positive terminal shall be connected to the positive conductor 1, automatic apparatus is provided to prevent connection of the rotary converter $R^1$ to the conductors 1 and 2 unless the brush 9 is positive.

A conductor 11 connects the brush 9 with one terminal 12 of a switch or automatic circuit breaker P comprising the movable contact member 13 adapted to bridge the terminals 12 and 14, the terminal 14 being connected by a conductor 15 with the conductor 1. A conductor 16 connects the brush 10 with the terminal 17 of a switch or circuit breaker N comprising the movable contact member 18 adapted to bridge the terminals 17 and 19, the terminal 19 being connected by conductor 20 with the negative conductor 2. The switch or circuit breaker P may be termed the positive switch or breaker, while the switch or breaker N may be considered the negative switch or breaker. These switches or circuit breakers P, N are of any suitable or well known structure which may be latched in circuit closing position, the latching mechanism of both being actuated upon energization of the tripping coil 21 to cause both switches or breakers to open.

The switch or breaker N is preferably operated by hand, to close and latch it, while the switch or breaker P is actuated to circuit closing position by a motive device as an electric motor M comprising the armature A and the series field winding F, the armature A having the shaft 22, Fig. 4, which drives the worm 23, connected to the shaft 22 by universal joint 24. The worm 23 is adapted to mesh with and drive the gear segment 25 having the crank 26, to which is pivoted at 27 the pitman or connecting rod 28 connected to the mechanism for actuating the movable contact member 13 of switch or breaker P, all as well understood in the art.

The conductors 29 and 30, Fig. 1, are those of a direct current control circuit connected to an independent source of energy, or said conductors may be connected, respectively, with the positive and negative conductors 1 and 2. Connected with the conductor 29 is the operator's switch 31 adapted to engage either of the contacts 32 or 33. Contact 32 is connected by conductor 34 to one terminal of the trip coil 21 whose other terminal is connected to the contact 35 adapted to be connected to the contact 36 by the bridging member 37, which separates from the contacts 35 and 36 when the contact member 13 moves to open circuit position and which engages such contacts when the contact member 13 is moved to circuit closing position. The contact 36 connects by conductor 38 to the negative conductor 30 of the control circuit.

The conductor 38 connects also with the contact 39, with which is associated the contact 40, the bridging member 41 adapted to bridge these contacts when the movable contact member 18 is in circuit closing position and to separate from them when contact member 18 moves to open circuit position. The contact 40 is connected by conductor 42 with one terminal of the serially connected magnet windings 43 and 44, whose other terminal is connected by conductor 45 to the control circuit conductor 29.

The conductor 11, connected to the brush 9 of rotary converter $R^1$, connects with one terminal of the serially connected magnet windings 46 and 47, whose other terminal connects by conductor 48 with the switch contact 49, with which is associated the switch contact 50 connected by conductor 16 with the brush 10 of the rotary converter $R^1$. The bridging member 51 engages contacts 49 and 50 when the contact member 18 is in circuit closing position, and separates from them when member 18 moves to open circuit position.

Magnet windings 43 and 44 may be connected in parallel with each other in lieu of in series; and likewise windings 46 and 47 may be connected in parallel with each other.

The magnet windings 43 and 46 have a common magnetic circuit comprising the yoke 52 and the cores 53 and 54, having, respectively, the poles 55 and 56. The magnet windings 44 and 47 have a common magnetic circuit comprising the yoke 57 and the cores 58 and 59 having, respectively, the poles 60 and 61, the two magnetic circuits described being magnetically independent of each other.

In Fig. 1 an armature structure co-operating with the aforesaid magnetic circuits is idicated as a member 62 pivoted at 63. The armature structure in Figs. 2, 3 and 4 comprises an armature 64 and an armature 65, preferably but not necessarily magnetically independent of each other and secured to the non-magnetic member 66 pivoted at 67, 67 in a frame 68, the armature 64 co-operating with poles 55 and 56 and armature 65 co-operating with poles 60 and 61 but prevented from reaching them by non-magnetic stops $65^a$. Carried by the armature structure is a contact 69 adapted to bridge the contacts 70 and 71. Secured to the armature structure is a bracket 72 carrying pin $72^a$ extending through slot $73^a$ in rod 73, whereby suitable lost motion is allowed. The rod 73 is pivoted at its lower end at 74 to latch member 75 pivoted to the base at 76 and having the latch hook 77 extending into the path of travel of the abutment $25^a$ on the gear segment 25 to lock or restrain gear 25 to prevent actuation of breaker P either by hand or by motor M.

The contact 33 of the operator's switch is connected by conductor 78 with contact 71, and contact 70 is connected by conductor 79 to the movable switch lever 80 and to one terminal of the motor field F whose other terminal connects with the motor armature A, whose other terminal connects through the closed motor control switch 81 through conductor 38 to the control circuit conductor 30. The switch lever 80 is in engagement with the contact 82, which connects by conductor 83 with one terminal of the resistance 84 and one terminal of the magnet coil 85 whose other terminal connects with the switch 81, the coil 85 when energized serving to move the worm 23, Fig. 4, through toggle $85^a$, $85^b$, into mesh with the gear segment 25, as well understood in the art. Connected to the switch 81 and switch contact 82 by conductors 86 and 87 is the relay coil 88, which when energized raises its armature and brings the contact 89 into engagement with the contacts 90 and 91, of which the former is connected through conductor 45 with the control circuit conductor 29 and of which the latter is connected by conductor 92 with the switch contact 93 which, with contact 94 connected to the remaining terminal of the resistance 84, is adapted to be engaged by the localizing switch lever 80.

The operation is as follows:

If the terminals 9 and 10 of the source of current, as rotary converter $R^1$, are of proper polarity, that is, terminal 9 positive and terminal 10 negative, the source $R^1$ may be connected to the conductors 1 and 2 as follows:

First the negative breaker N is closed as by hand, in which case the terminals 17 and 19 are bridged by the contact 18, contacts 39 and 40 are connected by bridge 41 and contacts 49 and 50 are bridged by contact 51. Accordingly, current flows from the positive terminal 9 through conductor 11, the magnet windings 46 and 47, conductor 48, switch 49, 50, conductor 16, to negative terminal 10, thereby energizing coils 46 and 47, which cause the poles 56 and 61 to be, for example, north and south poles, respectively. Simultaneously current flows from the positive control conductor 29 through conductor 45, magnet windings 44 and 43, conductor 42, switch 39, 40, conductor 38 to the negative control 30, thereby energizing coils 44 and 43, whose poles 55 and 60 are both south poles. Accordingly the magnet windings 43 and 46 operate cumulatively upon their magnetic circuit to produce a powerful attraction upon their armature 64; simultaneously, however, the magnet windings 44 and 47 oppose each other as to their magnetic circuit so that they exert little or no attraction upon the armature 65. Accordingly the armature 64 is attracted, the armature structure moving in a counterclockwise direction, as viewed in Fig. 4, causing the contact 69 to bridge contacts 70 and 71 and simultaneously lifting the hook latch 77 to allow extended movement of the gear segment 25.

The operator may now throw the switch 31 into engagement with contact 33, whereupon current will flow from the positive control conductor 29 through the operator's switch, contacts 71, 70, switch blade 80, contact 82, field F and armature A of the motor M, also through engaging coil 85, and switch 81 to the negative supply circuit conductor 30. This energizes the motor, which starts to rotate and also energizes the engaging coil 85, which, through toggle 85$^a$, 85$^b$, shifts the worm 23 into engagement with gear segment 25 which is then rotated by the motor armature and pulls downwardly upon the rod 28, which starts to close the switch or breaker P.

In addition to shifting the worm 23 into mesh with gear 25, the engaging coil 85, (through levers 80$^a$ and 80$^b$, movable in unison with the worm 23 and lever 80$^c$, pivoted to 80$^b$ at 80$^d$ and pivoted to a fixed part at 80$^e$, Fig. 4), shifts the localizing switch 80 from contact 82 into engagement with contacts 93 and 94 before eventually breaking contact with the contact 82. Simultaneously with energization of the energizing coil 85 the relay coil 88 is energized, bringing the contact 89 into engagement with contacts 90 and 91, so that when the localizing switch 80 engages contacts 93 and 94, the operator's switch 31 is robbed of control of the motor M, which continues to run until the contact member 13 is moved to circuit closing position, whereupon the motor switch 81 is opened (by lever 81$^a$ actuated by rod 81$^b$ to which it is pivoted at 81$^c$, the rod 81$^b$ being actuated by the arm 81$^d$, to which it is pivoted at 81$^e$, the arm 81$^d$ moving with the gear 25, Fig. 4,) with resultant deenergization of the motor, the engaging coil 85 and the relay 88. The motor switch 81 remains open until the breaker P is tripped as by energizing coil 21 by throwing switch 31 into engagement with contact 32; the switch 81 is closed as breaker P opens, and is then in readiness for subsequent operation of the motor M.

The relay 88 is provided to prevent improper or untimely energization of the motor M by manually shifting the localizing switch 80 into engagement with contacts 93 and 94; the contact 93 ordinarily heretofore being connected directly to the conductor 45. The relay 88 is preferably located at such distance from the switch 80 that a person cannot simultaneously reach or actuate both; the relay 88 is generally placed on the rear of the motor panel of the switchboard, while the switch 80 is on the front thereof. By this arrangement the motor M cannot be energized, so long as the switch 31 is open, either by moving the switch 80 into engagement with contacts 93 and 94, or by raising the contact 89 of the relay 88 into engagement with contacts 90 and 91.

The foregoing operation is the normal one when the terminal 9 of the source R$^1$ is properly positive or of proper polarity with respect to the conductor 1 or conductor 29. If, however, the source of current, as rotary R$^1$, has its polarity reversed so that its terminal 9 is negative instead of positive, as frequently occurs in the case of a rotary converter, the breaker N may be manually closed, but it will be impossible to move the breaker P to circuit closing position by the motor M or by hand. This is due to the fact that the direction of current through the coils 46 and 47 will be reversed, due to reversal of polarity of the source R$^1$, and the poles 56 and 61 will in such case be south and north poles, respectively, or generally speaking, reversed. The coils 46 and 43 in such case oppose each other as to their common magnetic circuit, and there is little or no attraction exerted upon the armature 64; on the other hand, the coils 44 and 47 now operate cumulatively upon their magnetic circuit and exert an attraction upon the armature 65 which prevents movement of the armature structure to bridge contacts 70 and 71 or to lift the latch 77. So long as the contacts 70 and 71 are not bridged by contact 69, movement of operator's switch 31 into engagement with contact 33 will be powerless to energize the motor and cause closure of the breaker P, and therefore one terminal of the source R$^1$ is prevented from communication with the conductor 1. It will then be necessary to reverse the polarity of the source R$^1$, and when this is a rotary converter, its reversal of polarity is accomplished in well known manner, as, for example, causing its armature to fall back a half cycle, whereupon the polarity will be proper for connection with the circuit 1, 2, the coils 46 and 47 being now traversed by current in proper direction to effect bridging of contacts 70 and 71 and release of latch 77, which latter, when in its lower position, prevents closure of the switch or circuit breaker P either by hand or by motor M.

Certain features herein disclosed but not claimed are claimed in Letters Patent numbered 1,340,918, granted me May 25, 1920.

What I claim is:

1. The combination with a circuit, of a source of current, switching mechanism for connecting said source of current with said circuit comprising a manually closable switch and a second independently closable switch, a motive device for actuating said second switch, and means preventing actuation of said mechanism by said motive device except upon predetermined polarity relation between said source of current and said circuit comprising electro-magnetic means responsive to correct polarity relation, a latch locking said second switch open and controlled by said electro-magnetic means, and a switch controlling said motive device controlled by said electro-magnetic means.

2. The combination with a circuit, of a source of current, switching mechanism for connecting the same with said circuit, a motive device for actuating said switching mechanism, means for restraining said switching mechanism in open position, electro-magnetic means responsive to predetermined polarity relation between said source of current and said circuit, a control switch controlling said motive device, said electro-magnetic means controlling said restraining means and said control switch.

3. The combination with a circuit, of a source of current, switching mechanism for connecting the same with said circuit, a motive device for actuating said switching mechanism, a lock for restraining said switching mechanism against actuation, means responsive to predetermined polarity relation between said source of current and said circuit controlling said lock, a control switch controlling said motive device and controlled by said polarity responsive means, and an operator's switch through which said control switch controls said motive device.

4. The combination with a circuit, of a source of current, switching mechanism for connecting said source of current with said circuit, a motive device for actuating said switching mechanism, an operator's switch controlling said motive device, a second switch in series with said operator's switch in the circuit of said motive device, and electro-magnetic means responsive to predetermined polarity relation between said source of current and said circuit controlling said second switch.

5. The combination with a circuit, of a source of current, switching mechanism for connecting said source of current with said circuit, a motive device for actuating said switching mechanism, an operator's switch controlling said motive device, a second switch co-operating with said operator's switch in controlling said motive device, electro-magnetic means responsive to predetermined polarity relation between said source of current and said circuit controlling said second switch, and a localizing switch controlled by said switches and robbing them of control of said motive device.

6. The combination with a circuit, of a source of current, switching mechanism for connecting said source of current with said circuit, and electro-magnetic means controlling actuation of said switching mechanism comprising a magnetic circuit, and windings associated with said magnetic circuit and co-acting differentially and cumulatively in accordance with different relations of the polarities of said source and circuit, one of said windings traversed by current whose direction is dependent upon the polarity of said source of current, and another of said windings traversed by current in a predetermined direction, said windings when operating cumulatively allowing actuation of said switching mechanism.

7. The combination with a circuit, of a source of current, switching mechanism for connecting said source of current with said circuit, and electro-magnetic means controlling actuation of said switching mechanism comprising an armature structure and a pair of magnets, each magnet comprising windings one of which is traversed by current whose direction is dependent upon the polarity of said source of current and another of which is traversed by current of predetermined direction, the windings of one of said magnets operating cumulatively when the windings of another of said magnets operate in opposition to each other, whereby said armature structure is controlled by the one or the other of said magnets depending upon the polarity relation of said source of current to said circuit.

8. The combination with a circuit, of a source of current, independently closable switches intervening between a plurality of terminals of said source and a plurality of conductors of said circuit, electro-magnetic means responsive to predetermined polarity relation between said source of current and said circuit controlling actuation of one of said switches, and switching mechanism controlling said electro-magnetic means and actuated when another of said switches is actuated.

9. The combination with a circuit, of a source of current, independently closable switches intervening between a plurality of terminals of said source and a plurality of conductors of said circuit, electro-magnetic means responsive to predetermined polarity relation between said source of current and said circuit controlling actuation of one of said switches, and switching mechanism rendering said electro-magnetic means operative actuated when another of said switches is moved to circuit closing position.

10. The combination with a circuit, of a source of current, independently closable switches intervening between a plurality of terminals of said source and a plurality of conductors of said circuit, electro-magnetic means responsive to predetermined polarity relation between said source of current and said circuit controlling actuation of one of said switches, said electro-magnetic means comprising a plurality of coils one of which is traversed by current whose direction is dependent upon the polarity of said source of current and another of which is traversed by current of predetermined direction, and a control switch for one of said windings actuated to render said winding operative upon closure of another of said switches.

11. The combination with a circuit, of a source of current, independently closable switches intervening between a plurality of terminals of said source and a plurality of conductors of said circuit, electro-magnetic means responsive to predetermined polarity relation between said source of current and said circuit controlling actuation of one of said switches, said electro-magnetic means comprising a plurality of coils one of which is traversed by current whose direction is dependent upon the polarity of said source of current and another of which is traversed by current of predetermined direction, and control switches in the circuits of said windings rendering said windings operative upon actuation of said control switches upon closure of another of said switches.

12. The combination with a circuit, of a rotary converter, independently closable switches intervening between direct current terminals of said converter and conductors of said circuit, electro-magnetic means responsive to predetermined polarity relation between said direct current terminals and said circuit preventing actuation of one of said switches to closed position, and switching mechanism actuated when another of said switches is actuated to closed position controlling said electro-magnetic means.

13. The combination with a circuit, of a rotary converter, independently closable switches intervening between direct current terminals of said converter and conductors of said circuit, electro-magnetic means responsive to predetermined polarity relation between said direct current terminals and said circuit, a motor for actuating one of said switches to closed position, a switch controlled by said electro-magnetic means and controlling the circuit of said motor, and an operator's switch in series with said motor control switch, whereby said electro-magnetic means prevent energization of said motor through said operator's switch upon existence of said predetermined polarity relation.

14. Electro-magnetic means responsive to the relation of the polarity of one source to the polarity of another source comprising armature structure and a pair of magnets, each magnet comprising windings traversed by currents whose directions are dependent, respectively, upon the polarities of the different sources, the windings of one of said magnets operating cumulatively when the windings of another of said magnets operate in opposition to each other, whereby said armature structure is controlled by the one or the other of said magnets depending upon the relation of the polarities of said sources.

In testimony whereof I have hereunto affixed my signature this 4th day of May, 1918.

WILLIAM M. SCOTT.